United States Patent
Gorsica

(10) Patent No.: US 10,664,227 B1
(45) Date of Patent: May 26, 2020

(54) SMART AUDIO PATH ROUTING

(71) Applicant: MOTOROLA MOBILITY LLC, Chicago, IL (US)

(72) Inventor: John J. Gorsica, Round Lake, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/212,399

(22) Filed: Dec. 6, 2018

(51) Int. Cl.
  *G06F 17/00* (2019.01)
  *G06F 3/16* (2006.01)

(52) U.S. Cl.
  CPC .................. *G06F 3/165* (2013.01)

(58) Field of Classification Search
  CPC ........................................ G06F 3/165
  See application file for complete search history.

(56) References Cited

U.S. PATENT DOCUMENTS

| | | | | |
|---|---|---|---|---|
| 2004/0236444 A1* | 11/2004 | Abrams, Jr. | ............ | G06F 21/10 700/94 |
| 2009/0034750 A1* | 2/2009 | Ayoub | ............... | G10L 25/69 381/77 |
| 2013/0083935 A1* | 4/2013 | Yang | .................... | H04R 29/00 381/58 |
| 2013/0142346 A1* | 6/2013 | Yang | ................... | H04R 29/001 381/58 |
| 2017/0041724 A1* | 2/2017 | Master | ................... | G06F 3/165 |

* cited by examiner

*Primary Examiner* — Joseph Saunders, Jr.
(74) *Attorney, Agent, or Firm* — Yudell Isidore PLLC

(57) ABSTRACT

An electronic device, method, and computer program product provide smart audio path routing to a remote audio system. A controller of an electronic device determines whether a configuration setting indicates that primary audio content is to be transmitted to a remote audio system. In response to the configuration setting indicating the primary audio is to be transmitted to the remote audio system, the controller transmits test audio content to the remote audio system. The controller listens, via a microphone of the electronic device, for the test audio content within audio output from the remote audio system. In response to not detecting the test audio content from the remote audio system, the controller enables playing of the primary audio content on speaker(s) of the electronic device. In response to detecting the test audio content, the controller transmits the primary audio content to be outputted by the remote audio system.

20 Claims, 6 Drawing Sheets

SMART AUDIO PATH ROUTING

BACKGROUND

1. Technical Field

The present disclosure relates generally to audio signal interfaces between devices, and more particularly to controllers for selectively routing audio signals to different devices.

2. Description of the Related Art

Mobile user devices such as smart phones are increasingly being utilized as personal assistants, incorporating sufficient intelligence to readily call up a desired function in response to a user command. Examples of personal assistance include the capability of providing communication, social media, navigational assistance, personal organization, and audiovisual entertainment. Increasingly, the use of mobile user devices for such functions has become ubiquitous, replacing dedicated systems that used to provide a limited number of functions. Many of these functions include an audio output. However, because these mobile user devices tend to be small, with minimal real estate for battery and audio speakers, the mobile user devices do not support an audio output equivalent to what a consumer can expect from car and home audio systems. Occasionally, consumers may need to use such audio systems that are remote to the mobile user device for audio playback. For example, many jurisdictions require hands-free operation of user devices when the device user is driving a vehicle. As another example, a home or business audio system may be required to share the audio output from a mobile user device with a larger group.

Consumers are becoming accustomed to using always-on voice commands and intuitive graphical user interfaces available via their mobile user device. However, legacy audio systems were not designed to interface with mobile user devices. Consumers can find interfacing the audio content of their mobile user device to a legacy remote audio system to be frustrating. An auxiliary mechanism or other form of synchronization may be provided, but these often fail to complete the routing of audio content for playback due to incorrect control configuration or incompatibilities between the mobile device and remote audio system.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
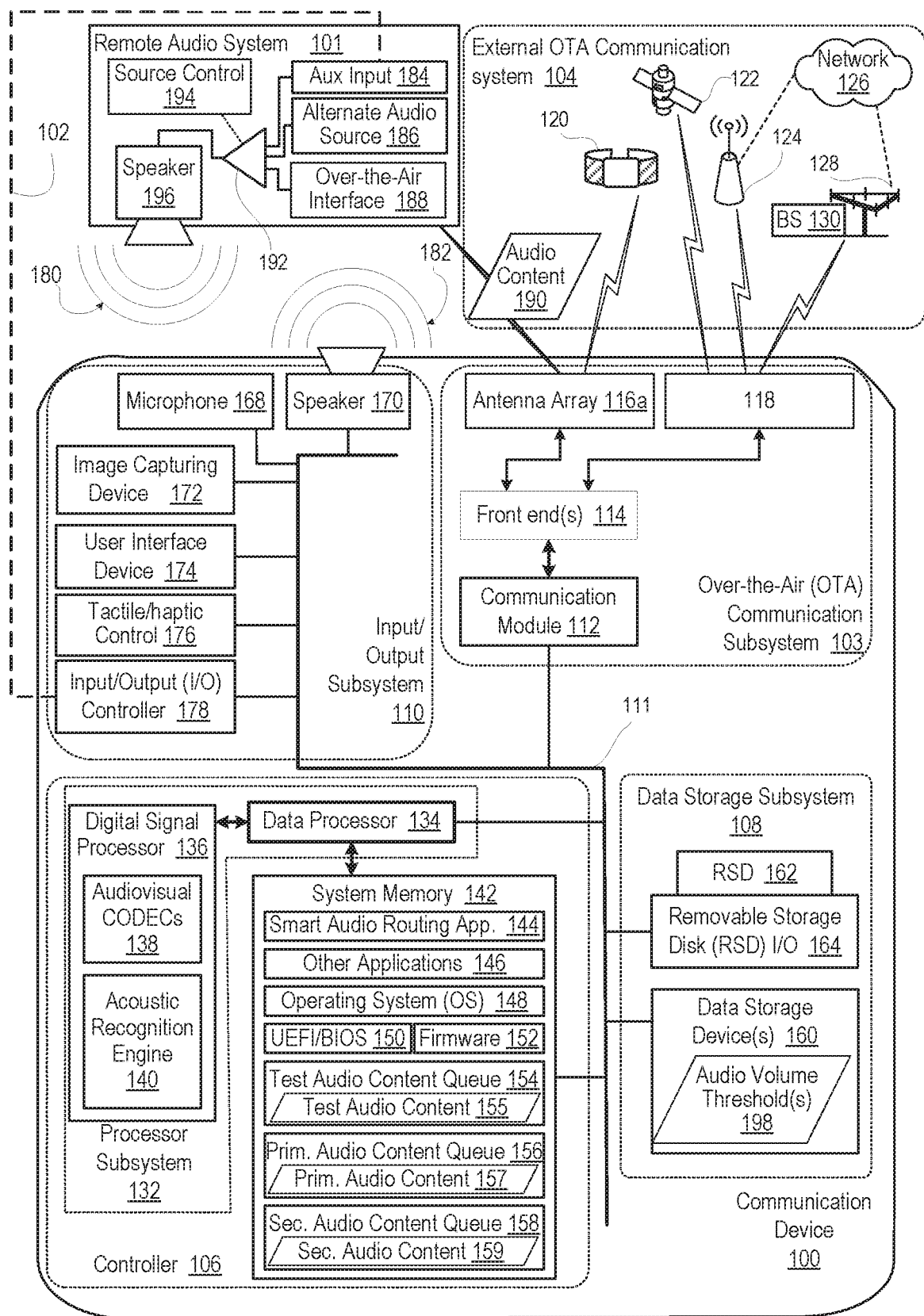
FIG. 1 is a simplified functional block diagram illustrating an electronic device that performs smart audio path routing to an external audio system, according to one or more embodiments.

According to aspects of the present innovation, an electronic device, method, and computer program product provide smart audio path routing to a remote audio system. A controller of an electronic device determines whether a configuration setting indicates that primary audio content is to be transmitted to a remote audio system to output acoustically. In response to determining that the configuration setting indicates the primary audio is to be transmitted to the remote audio system, the controller enables the electronic device to transmit test audio content to the remote audio system. The controller listens, via a microphone of the electronic device, for audio output from the remote audio system. In response to not detecting audio output from the remote audio system that is recognized as the test audio content, the controller enables the electronic device to play the primary audio content on one or more speakers of the electronic device.

In one aspect of the present disclosure, an electronic device includes a device interface, at least one speaker, a microphone, a memory containing audio content and a configuration setting, and a controller. The controller is communicatively coupled to the device interface, the at least one speaker, the microphone, and the memory. The controller executes an audio control utility that enables the electronic device to determine whether the configuration setting indicates primary audio content is to be transmitted to a remote audio system to output acoustically. In response to determining that the configuration setting indicates transmitting the primary audio to the remote audio system, the controller enables the electronic device to transmit test audio content to the remote audio system. The controller listens, via a microphone of the electronic device, for audio output from the remote audio system. In response to not detecting audio output from the remote audio system that is recognized as the test audio content, the controller enables the electronic device to play primary audio content on one or more speakers of the electronic device.

According to one or more aspects of the present disclosure, a computer program product includes program code on the computer readable storage device. When executed by a processor associated with an electronic device, the program code enables the electronic device to provide functionality according to the present innovation. The functionality includes determining, by a controller of the electronic device, whether a configuration setting indicates primary audio content is to be transmitted to a remote audio system to output acoustically. In response to determining that the configuration setting indicates transmitting the primary audio to the remote audio system, the functionality includes: (i) transmitting, by the electronic device, test audio content to the remote audio system; (ii) listening, via a microphone of the electronic device, for audio output from the remote audio system; and (iii) in response to not detecting audio output from the remote audio system that is recognized as the test audio content, playing the primary audio content on one or more speakers of the electronic device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

FIG. 1 is a simplified functional block diagram illustrating example electronic device 100 that performs smart audio path routing to external remote audio system 101. In one or more embodiments, electronic device 100 is communicatively coupled to remote audio system 101 via wired connection 102. In one or more embodiments, electronic device 100 incorporates over-the-air (OTA) communication capabilities to operate as a wireless and/or cellular user device. Electronic device 100 can be one of a host of different types of devices, including but not limited to, a mobile cellular phone or smart-phone, a laptop, a net-book, an ultra-book, a networked smart watch or networked sports/exercise watch, and/or a tablet computing device or similar device that can include wireless communication functionality. As a device supporting wireless communication, electronic device 100 can be one of, and also be referred to as, a system, device, subscriber unit, subscriber station, mobile station (MS), mobile, mobile device, remote station, remote terminal, user terminal, terminal, user agent, user device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. These various devices all provide and/or include the necessary hardware and software to support the various wireless or wired communication functions as part of a communication system.

Referring now to the specific component makeup and the associated functionality of the presented components, electronic device 100 includes OTA communication subsystem 103 that communicates with external OTA communication system 104. Electronic device 100 provides computing and data storage functionality in support of OTA communication with external OTA communication system 104, as well as other functions, with controller 106, data storage subsystem 108, and input/output (I/O) subsystem 110 that are communicatively coupled via system interlink 111.

OTA communication subsystem 103 includes communication module 112 that encodes data for transmission and decodes received data according to an applicable communication protocol. OTA communication subsystem 103 includes front end(s) 114 that transceive information and data with external OTA communication system 104 via antenna arrays 116a-b mounted within device housing 118. Antenna arrays 116a-b transmit and receive signals.

In one or more embodiments, controller 106, via OTA communication subsystem 103, can perform multiple types of OTA communication with external OTA communication system 104. OTA communication subsystem 103 can communicate with one or more personal access network (PAN) devices such as via a Bluetooth wireless link. Remote audio system 101 and smart watch 120 are examples of PAN devices. OTA communication subsystem 103 can also communicate with global positioning system (GPS) satellites 122, and wireless local access network (WLAN) node 124 of a WLAN. WLAN node 124 is communicatively connected to a wide area network 126, such as the Internet. OTA communication subsystem 103 can also communicate with radio access network (RAN) 128 having a base station (BS) 130. RAN 128 is a part of a wireless wide area network (WWAN) that is connected to wide area network 126 and provides data or voice services.

Controller 106 controls the communication, user interface, and other functions and/or operations of electronic device 100. These functions and/or operations include, but are not limited to including, application data processing and signal processing. Electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard wired logic. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections are illustrated in FIG. 1, it is to be understood that more, fewer, or different interconnections may be present in other embodiments.

Controller 106 includes processor subsystem 132 that executes program code to provide functionality of electronic device 100. Processor subsystem 132 includes one or more central processing units (CPUs) ("data processor") 134. Processing subsystem 132 can include a digital signal processor (DSP) 136. DSP 136 can have hardware or software that is directed to operating as audio or video codec modules 138 and acoustic recognition engine 140. Codec is a portmanteau of coder-decoder. Controller 106 includes system memory 142 for containing actively used program code and data. System memory 142 can include therein a plurality of such program code and modules, including applications, such as smart audio routing application 144 and other applications 146. System memory 142 can also include operating system (OS) 148, firmware interface 150 such as basic input/output system (BIOS) or Uniform Extensible Firmware Interface (UEFI), and platform firmware (FW) 152. These software and/or firmware modules have varying functionality when their corresponding program code is executed by processor subsystem 132 or secondary processing devices within electronic device 100. Data is stored in system memory 142, which includes test audio content queue 154 containing test audio content 155, primary audio content queue 156 containing primary audio content 157, and secondary audio content queue 158 containing secondary audio content 159.

Data storage subsystem 108 provides nonvolatile storage accessible to controller 106. For example data storage subsystem 108 can provide a large selection of other applications 146 that can be loaded into system memory 142. Local data storage device(s) 160 can include hard disk drives (HDDs), optical disk drives, solid state drives (SSDs), etc. In one or more embodiments, removable storage device (RSD) 162 that is received in RSD interface 164 is a computer readable storage device, which can be referred to as non-transitory. RSD 162 can be accessed by controller 106 to provision electronic device 100 with program code that when executed by controller 106 provides the functionality to electronic device 100 to perform aspects of the present disclosure.

I/O subsystem 110 provides input and output devices, such as for enabling user inputs, presenting audiovisual content, or monitoring external audio output. In one or more embodiments, I/O subsystem 110 includes microphone 168, at least one internal speaker 170, image capturing device 172, user interface device 174, tactile/haptic control 176, and input/output (I/O) controller 178. Microphone 168 can monitor remote audio output 180 from a user or remote audio system 101. At least one internal speaker 170 can locally produce local audio output 182, such as audio media playback and alerts. Image capturing device 172, such as a camera, can receive user gestures and other image data. User interface device 174 can present visual or tactile outputs as well as receive user inputs. Tactile/haptic control 176 can provide an interface such as for braille reading or manual inputs. I/O subsystem 110 can be wholly or substantially encompassed by device housing 118 or be connected via I/O controller 178 as a peripheral device. I/O controller 178 can also interface with wired local access network (LAN).

Remote audio system 101 has multiple sources of audio content, such as an auxiliary (AUX) input 184 that connects to wired connection 102, an alternate audio source 186 such as AF/FM/Satellite radio, and OTA interface 188 that receives transmitted audio content 190 from electronic device 100. Speaker driver 192 is selectively coupled to one of the multiple sources by a source control 194. Speaker driver 192 communicatively couples the selected source of audio content to one or more speakers 196 of remote audio system 101 to produce remote audio output 180. Remote audio system 101 can be incorrectly wired or wirelessly connected to electronic device 100. In some instances remote audio system 101 can be correctly wired or wirelessly connected, yet be incorrectly configured for transmitted audio content 190 to be given proper priority or volume, in some of these instances, audio content 190 may not even output at all on speakers 196. Even if primary audio content 157 of transmitted audio content 190 is played, transmitted audio content 190 can include secondary audio content 159, such as alerts, that are not played by remote audio system 101. The present innovation mitigates the lack of selected remote audio output 180 by selectively using local audio output 182, avoiding significant degradation in user experience when a noticeable delay occurs in hearing either of remote or local audio outputs 180, 182.

The present disclosure utilizes microphone 168 on electronic device 100 to listen to/for remote audio output 180 to determine if transmitted audio content 190 sent to remote audio system 101 is being played (i.e., outputted on remote audio system speakers). If remote audio system 101 is configured properly for the user to hear transmitted audio content 190, electronic device 100 will also receive transmitted audio content 190 and confirm that the routing path is valid. If electronic device 100 cannot detect and recognize transmitted audio content 190 in remote audio output 180, then electronic device 100 reverts to using internal speaker 170 of electronic device 100 to output transmitted audio content 190.

In one or more embodiments, electronic device 100 is configurable to route audio content to either internal speakers 170 or to remote audio system 101. A trigger event can cause electronic device 100 to attempt to route transmitted audio content 190 to remote audio system 101. For example, a configuration setting can indicate that when a wired or wireless connection is being made between electronic device 100 and remote audio system 101 that transmitted audio content 190 is to be routed to remote audio system 101. For another example, electronic device 100 can detect a triggering event of a user input to change a configuration setting of routing audio content from internal speakers 170 to remote audio system 101. In one or more embodiments, the configuration setting can also indicate that test audio content 155 is initially sent wholly for detecting audio routing. For example, primary audio content 157 is not played on internal speakers 170 because user has selected the better sound quality of remote audio system 101. Confirmation of correct routing is performed before primary audio content 157 is routed. In one or more embodiments, transmitting test audio content 155 to remote audio system 101 allows for primary audio content 157 to initially be played on internal speakers 170 until confirmation is made that routing is effective to remote audio system 101. User may have selected a live broadcast or be conducting a live communication session that needs to continue uninterrupted. Electronic device 100 can distinguish test audio content 155 that is different from primary audio content 157 that is actively playing on internal speakers 170.

In one or more embodiments, in response to a trigger event, electronic device 100 initially transmits test audio content 155 as transmitted audio content 190. Test audio content 155 could be an audible tone, an ultrasonic tone, actual primary audio content 157, or an audible alert or artificial spoken announcement. In one or more embodiments, electronic device 100 can transmit uniquely recognizable test audio content 155 that enables a high correlation match to be made. Once test audio content 155 is recognized and determined to have sufficient audio volume, electronic device 100 can initiate playback of primary audio content 157 on remote audio system 101. In one or more embodiments, user experience is preserved for time sensitive audio output. Electronic device 100 can begin outputting primary audio content 157 on internal speaker 170 of electronic device 100 while transmitting test audio content 155 to remote audio system 101. In one or more alternate embodiments, primary audio content 157 is not time sensitive, such as playing a recorded medium. With these alternate embodiments, electronic device 100 does not play primary audio content 157 on internal speaker 170. In one or more embodiments, test audio content 155 is identical to primary audio content 157, and thus electronic device 100 does not play primary audio content on internal speaker 170 so that test audio content 155 can be clearly discerned. Electronic device 100 can periodically monitor the output to see if remote audio output 180 is recognized. For example, an automatic or manual change to remote audio system 101 could result in transmitted audio content 190 being eventually played. In one or more embodiments, where electronic device 100 is unable to increase the volume of remote audio output 180, user intervention can allow electronic device 100 to increase volume and subsequently enable electronic device 100 to fade out use of internal speaker 170. Electronic device 100 can determine whether volume of remote audio output 180 is satisfactory by referencing audio volume threshold(s) 198 contained in system memory 142 or data storage device(s) 160. In another embodiment, controller 106 of electronic device 100 can detect via microphone 168 whether all of transmitted audio content 190 is being played. For example, received voice calls or navigation alerts may not be outputted by remote audio system 101. Consequently, electronic device 100 can respond by playing, on internal speaker 170, this portion of transmitted audio content 190 that is not played by remote audio system 101.

Figure 2:
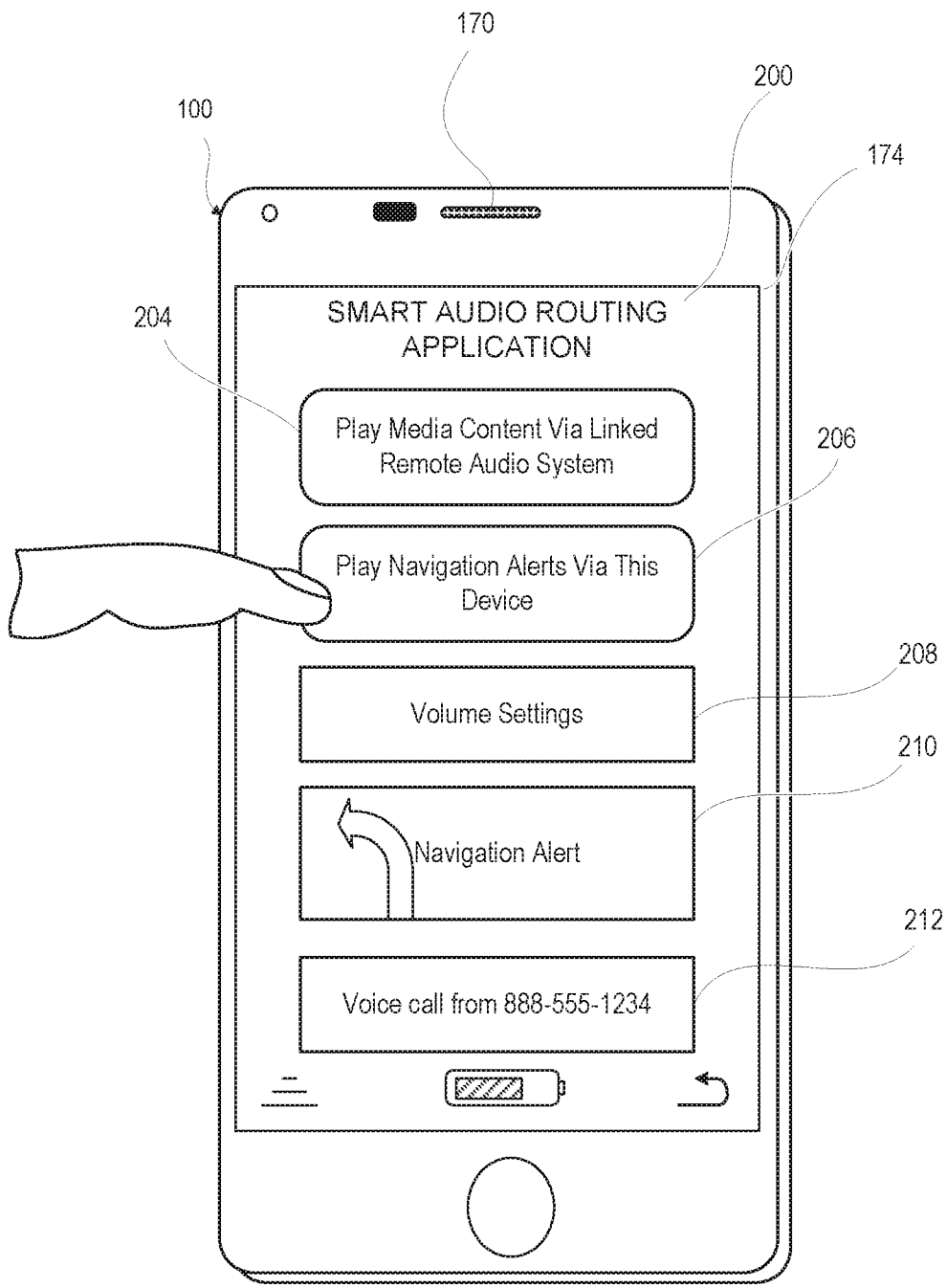
FIG. 2 is a front view of an interface device of an example electronic device presenting smart audio routing controls, according to one or more embodiments.

FIG. 2 is a front view of user interface device 174 of electronic device 100 that enables user inputs to control user interface 200 of smart audio routing application 144 (FIG. 1). Configuration setting icon 204 allows selection of the routing of audio output of primary audio content 157 (FIG. 1), such as media content, to one of remote audio system 101 (FIG. 1) or electronic device 100. Configuration setting icon 206 allows selection of the routing of audio output of secondary audio content 159 (FIG. 1), such as navigation alerts, to one of remote audio system 101 (FIG. 1) and electronic device 100. Volume settings icon 208 can navigate to a page of user controls to adjust user-selected volume setting and setting minimum or maximum volume threshold settings. For example, transmitted audio content 190 can be increased in volume according to user-selected volume settings, which remote audio system 101 (FIG. 1) may respond to. Maximum volume threshold can be used to automatically reduce user-selected volume setting if too low to avoid user discomfort. Minimum volume threshold can be set for a value below which remote audio output of the remote audio system 101 is deemed to be too low, prompting use of local audio output. Navigation status banner 210 and voice call status banner 212 represent other active applications on electronic device 100 that are contributing audio-visual content for presentation on one or both of remote audio system 101 and electronic device 100.

Figure 3:
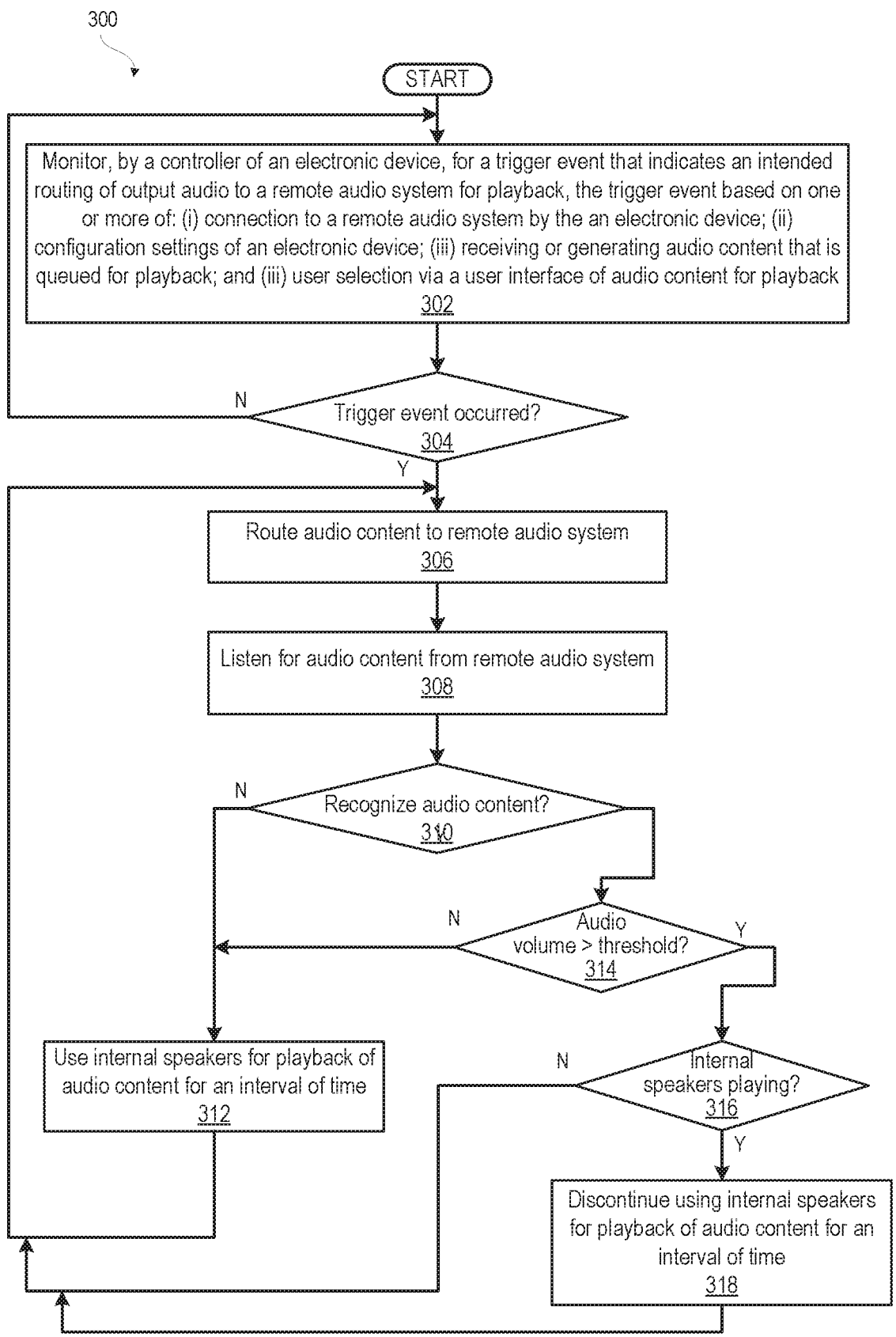
FIG. 3 is a high-level flow diagram illustrating a method for smart audio path routing from an electronic device to a remote audio system, according to one or more embodiments.

FIG. 3 is a flow diagram illustrating a method 300 for smart audio path routing from electronic device 100 to remote audio system 101 (FIG. 1). Method 300 includes monitoring, by controller 106 of electronic device 100 (FIG. 1), for a trigger event that indicates an intended routing of output audio to a remote audio system for playback, the trigger event based on one or more of: (i) connection to remote audio system 101 (FIG. 1) by the an electronic device; (ii) configuration settings of an electronic device; (iii) receiving or generating audio content that is queued for playback; and (iii) user selection via a user interface of audio content for playback (block 302). A determination is made whether the trigger event has occurred to route audio content of the electronic device to the remote audio system (decision block 304). In response to determining that the trigger event has not occurred, method 300 returns to block 302. In response to determining that the trigger event has occurred, method 300 includes routing audio content to a remote audio system (block 306). Method 300 includes listening for audio content from the remote audio system (block 308). A determination is made whether the audio content from the remote audio system is received and recognized (decision block 310). In response to determining that the audio content from the remote audio system is not received or received audio content is not recognized, method 300 includes using internal speakers for playback of audio content for an interval of time (block 312). Then method 300 returns to block 302. In response to determining that the audio content from the remote audio system is recognized, method 300 includes determining whether audio volume is greater than a threshold (decision block 314). The threshold 198 can be a fixed or user-configurable value that is contained in system memory 142 or data storage device(s) 160 of electronic device 100 (FIG. 1). In response to determining that the audio volume is not greater than the threshold, method 300 returns to block 312. In response to determining that the audio volume is greater than the threshold, a determination is made whether internal speakers of the electronic device are playing the audio content (decision block 316). In response to determining that the internal speakers are not playing the audio content, method 300 returns to block 306. In response to determining that the internal speakers are playing the audio content, method 300 includes discontinuing using internal speakers for playback of the audio content for an interval of time (block 318). Then method 300 returns to block 306.

Figure 4A:
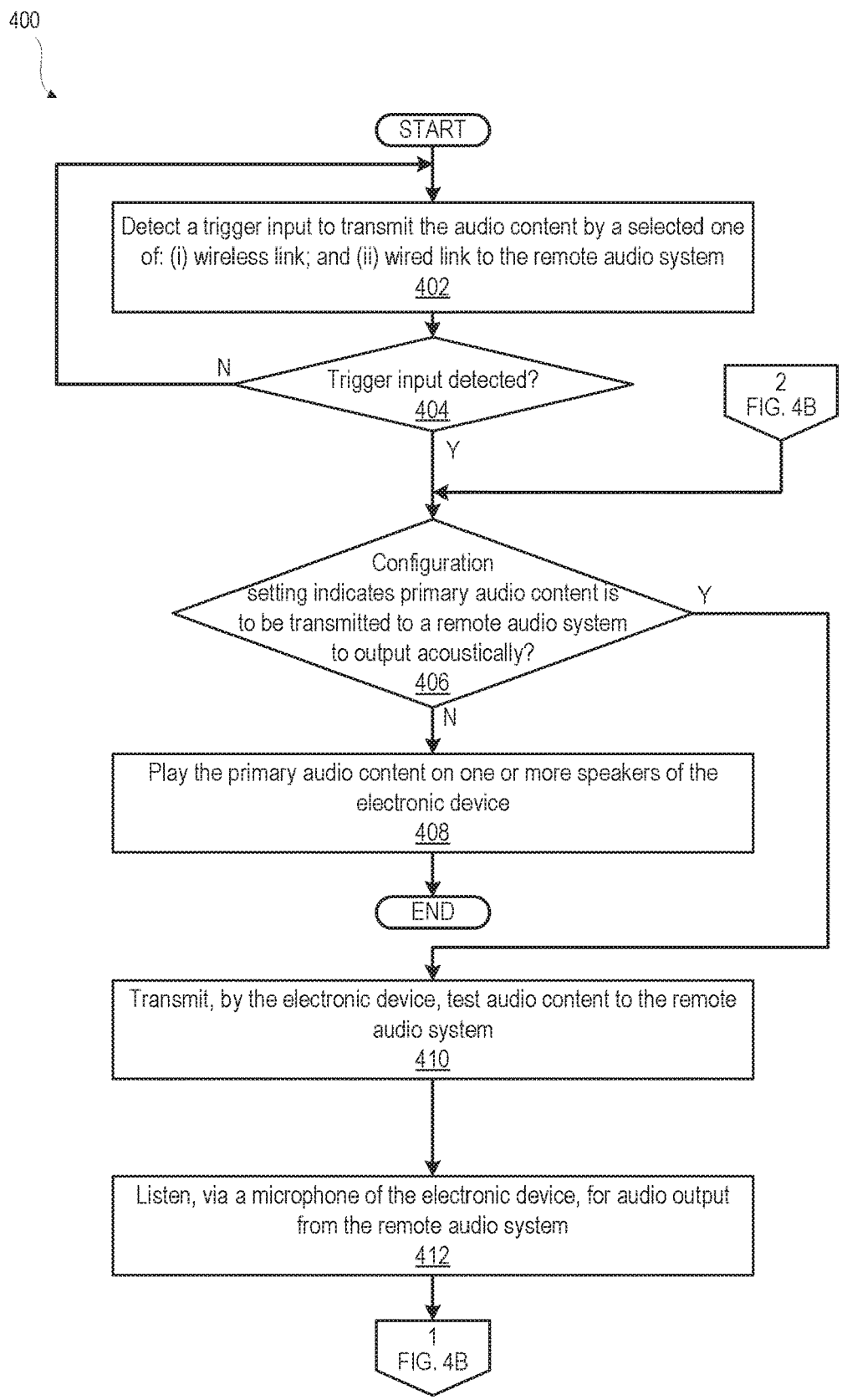
FIGS. 4A-B present a flow diagram illustrating an example method for smart audio path routing from an electronic device to a remote audio system, according to one or more embodiments.
Figure 4B:
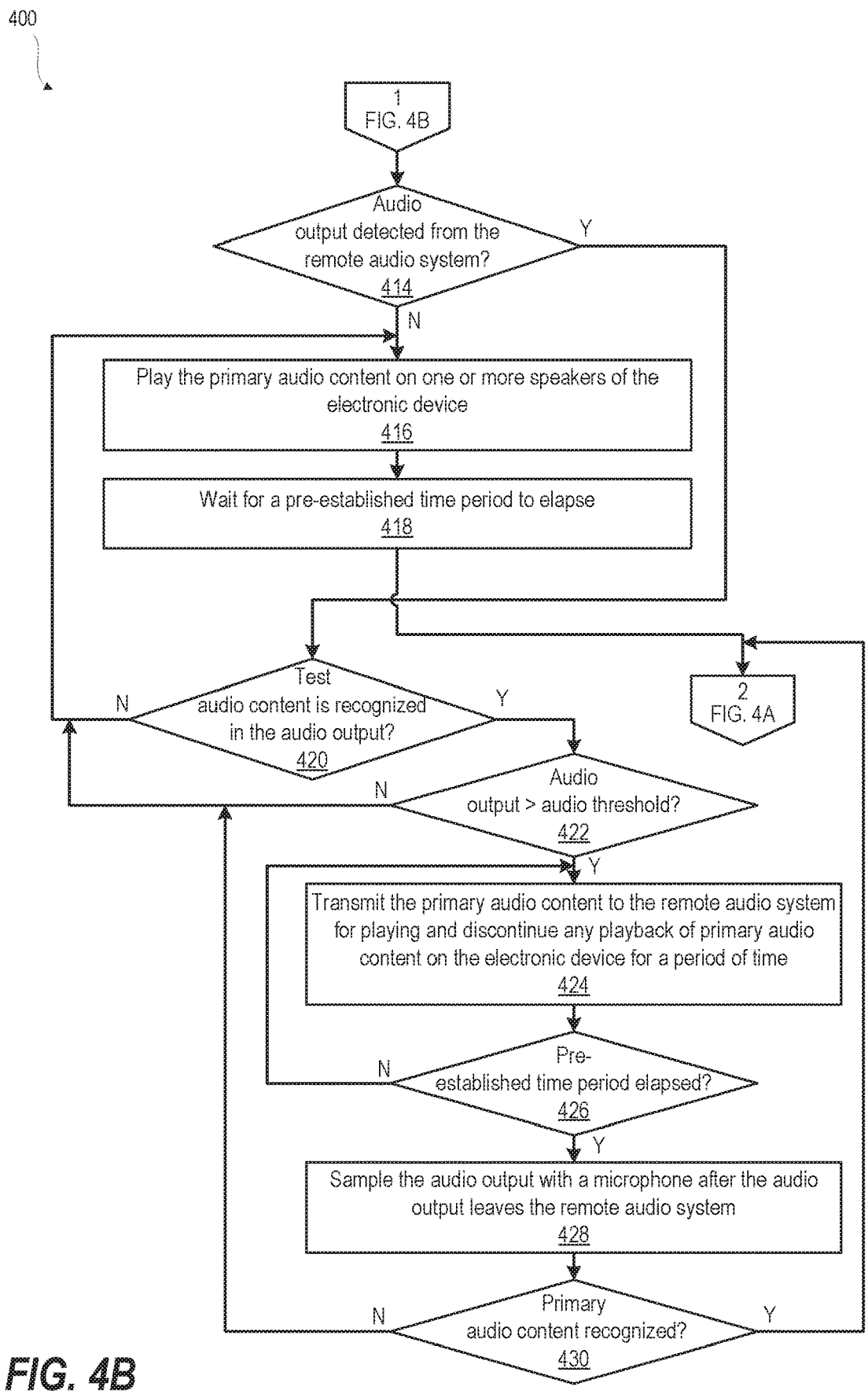

FIGS. 4A-B are a flow diagram illustrating example method 400 for smart audio path routing from electronic device 100 to remote audio system 101 (FIG. 1). In one or more embodiments, method 400 includes detecting a trigger input to transmit the audio content by a selected one of: (i) wireless link; and (ii) wired link to the remote audio system (block 402). A determination is made whether the trigger input is detected (decision block 404). In one embodiment, the trigger input can be receiving a user input at a user interface control that turns on audio playback. The user input can be a spoken word/phrase, a visual gesture, or a manual command. In one embodiment, the trigger input can be a pre-programmed timer that activates a particular function or application of an electronic device. In response to determining that the trigger input is not detected, method 400 returns to block 402. In response to determining that the trigger input is detected, method 400 includes determining, by controller 106 of the electronic device 100 (FIG. 1), whether a configuration setting indicates primary audio content is to be transmitted to a remote audio system to output acoustically (decision block 406). Electronic device can have configuration settings for selecting or defaulting to different audio speakers, earphones, auxiliary connections, etc. In response to determining that the configuration setting does not indicate primary audio content is to be transmitted to the remote audio system to output acoustically, method includes playing the primary audio content on one or more speakers of the electronic device (block 408). Then method 400 ends.

In response to determining that the configuration setting indicates primary audio content is to be transmitted to the remote audio system to output acoustically, method 400 includes transmitting, by the electronic device, test audio content to the remote audio system (block 410). In one or more embodiments, the test audio content is a unique acoustic pattern that is uniquely recognizable by the controller. The unique acoustic pattern aids in correct recognition, by the controller, of the test audio content as being present in remote audio output 180 of remote audio system 101 (FIG. 1). Controller can determine a match with a lower probability of a false positive recognition by using a unique acoustic pattern that is unlikely to be present in the ambient environment. In one or more embodiments, test audio content is above a frequency range of humanly perceptible sounds to avoid annoyance to a user. In one or more embodiments, test audio content is a light chime, ring, beep, or other selectable test sound, such as a favorite stanza of a school fight song. In one or more embodiments, the test audio content is primary audio content that is the ultimate objective of the playback.

Method 400 includes listening, via microphone 168 of electronic device 100, for audio output from the remote audio system 101 (FIG. 1) (block 412). A determination is made whether audio output is detected from the remote audio system (decision block 414). In response to not detecting audio output from the remote audio system, method 400 includes playing the primary audio content on one or more speakers of the electronic device (block 416). Method 400 includes waiting for a pre-established time period to elapse (block 418). Once the pre-established time elapses, method 400 returns to block 406.

In response to detecting audio output from the remote audio system in decision block 414, a determination is made as to whether the test audio content is recognized in the audio output (decision block 420). In response to not recognizing the test audio content in the audio output from the remote audio system, method 400 returns to block 416. In response to recognizing the test audio content in the audio output from the remote audio system, method 400 includes determining whether the volume of the audio output is greater than an audio volume threshold (decision block 422). In response to determining that the audio output volume is not greater than the audio volume threshold, method 400 returns to block 416. In response to determining that the audio output volume is greater than the audio volume threshold, method 400 includes transmitting the primary audio content to the remote audio system for playing and discontinuing any playback of primary audio content on the electronic device for a period of time (block 424). A determination is made whether a pre-established time period has elapsed (decision block 426). In response to determining that the pre-established time period has not elapsed, method 400 returns to block 424. In response to determining that the pre-established time period has elapsed, method 400 includes sampling the audio output with a microphone after the audio output leaves the remote audio system (block 428). A determination is made whether the primary audio content is recognized by the controller (decision block 430). Having a digital representation of both the primary audio content and the digital version of the audio output, controller performs a matching operation such as a correlation. The controller is looking to recognize a pattern of the primary audio content as contained in the audio output. In response to determining that the primary audio content is recognized, method returns block 426. In response to determining that the primary audio content is not recognized, method 400 returns to block 406.

Figure 5:
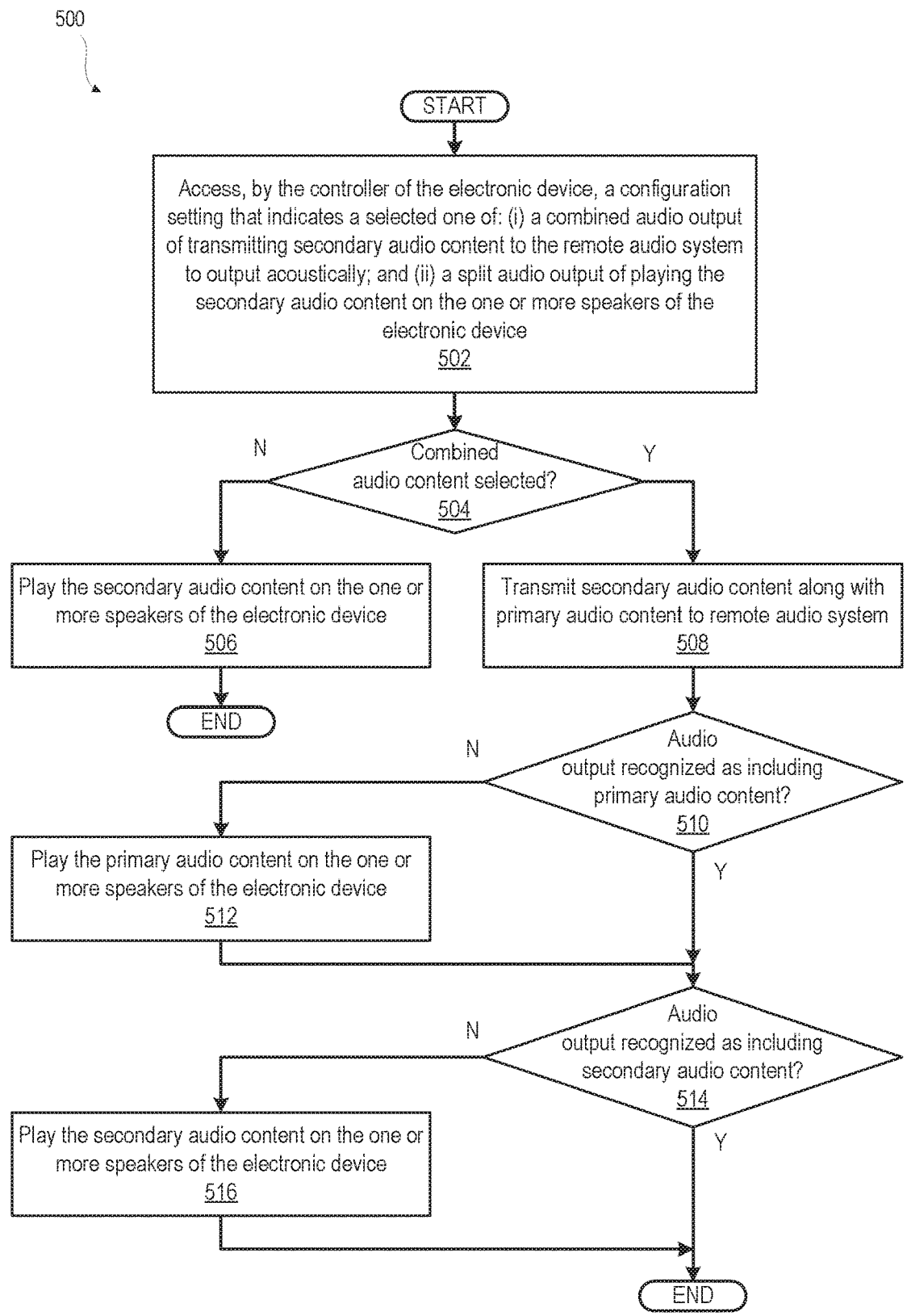
FIG. 5 is a flow diagram of a method for smart audio routing of multiple types of audio content, according to one or more embodiments.

FIG. 5 is a flow diagram of a method 500 of smart audio routing of multiple types of audio content, such as primary audio content and secondary audio content. For example, primary audio content can be music or spoken word that is presented by an entertainment application. Secondary audio content can be alerts, such as from a navigation application. In one or more embodiments, method 500 includes accessing, by the controller 106 of the electronic device 100 (FIG. 1), a configuration setting that indicates a selected one of: (i) a combined audio output that transmits secondary audio content to the remote audio system to output acoustically; and (ii) a split audio output where the secondary audio content is played on the one or more speakers of the electronic device, while the primary output is transmitted for outputting on/by the remote audio system (block 502). In one embodiment, the configuration setting can be one that is selected by a user of electronic device 100. In another embodiment, a default setting is provided from among the combined audio output and the split audio output. The user can then toggle the configuration to the other setting, if so desired. Returning to the flowchart, a determination is made whether the device is configured for combined audio output (decision block 504). In response to determining that the device is not configured for combined audio output (and is thus configured for split audio output), method 500 includes playing the secondary audio content on the one or more speakers of the electronic device (block 506). Monitoring of the audio output of the remote audio system for the primary audio content by the controller is as described above in method 400 (FIG. 4). Then method 500 ends.

In response to determining that combined audio content is selected in decision block 504, method 500 includes transmitting secondary audio content along with primary audio content to remote audio system (block 508). Method 500 includes determining, by the controller of the electronic device, whether the audio output from the remote audio system is recognized as including the primary audio content (decision block 510). In response to determining that the audio content is not recognized as including the primary audio content, method 500 includes playing the primary audio content on the one or more speakers of the electronic device (block 512). In response to determining, in decision block 510, that the audio content is recognized as including the primary audio content, method 500 includes determining, by the controller of the electronic device, whether the audio output from the remote audio system is recognized as including the secondary audio content (decision block 514).

In response to determining that the audio content is not recognized as including the secondary audio content in decision block 514, method 500 includes playing the secondary audio content on the one or more speakers of the electronic device (block 516). Then, method 500 ends. In response to determining that the audio content is recognized as including the secondary audio content in decision block 514, method 500 ends.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
   determining, by a controller of an electronic device, whether a configuration setting indicates audio content is to be transmitted to a remote audio system to output acoustically; and
   in response to determining that the configuration setting indicates transmitting the audio content to the remote audio system:
      transmitting, by the electronic device, test audio content to the remote audio system;
      listening, via a microphone of the electronic device, for audio output from the remote audio system;
      in response to not detecting audio output from the remote audio system that is recognized as the test audio content, playing the audio content on one or more speakers of the electronic device; and
      in response to detecting audio output from the remote audio system that is recognized as the test audio content;
         transmitting the audio content to the remote audio system to output acoustically;
         detecting, via the microphone, whether all of transmitted audio content is being played on the remote audio system; and
         in response to detecting that not all of the transmitted audio content is being played at the remote audio system: playing, on the one or more speakers of the electronic device, a corresponding portion of the transmitted audio content that is not being played by the remote audio system; and playing a remainder of the transmitted audio content on the remote audio system;
         wherein audio content that is not being played at the remote audio system is concurrently played on the one or more speakers, while other content is being played at the remote audio system.

2. The method of claim 1, wherein not detecting audio output that is recognized as the audio content comprises detecting no audio output from the remote audio system.

3. The method of claim 1, further comprising:
   detecting audio output from the remote audio system; and
   determining, by a controller of the electronic device, whether the audio output from the remote audio system is recognized as the audio content;
   in response to determining that the audio output is recognized as the audio content:

determining whether an audio volume of the audio output is greater than an audio output threshold; and in response to determining that the audio volume of the audio output is not greater than the audio threshold, playing the audio content on the one or more speakers of the electronic device.

4. The method of claim 1, further comprising:
including the audio content as the test audio output that is transmitted;
determining whether the audio output from the remote audio system continues to be recognized as the audio content; and
in response to determining that the audio output is no longer recognized as the audio content, reverting playing of the audio content to the one or more speakers of the electronic device.

5. The method of claim 1, wherein:
transmitting the test audio content to the remote audio system comprises transmitting a unique acoustic pattern that is uniquely recognizable by the controller;
listening, via the microphone of the electronic device, for the audio output from the remote audio system;
in response to not detecting audio output from the remote audio system that is recognized as the unique acoustic pattern, playing the audio content on one or more speakers of the electronic device; and
in response to detecting audio output from the remote audio system that is recognized as the unique acoustic pattern, transmitting the audio content to the remote audio system to output acoustically.

6. The method of claim 5, wherein transmitting the unique acoustic pattern comprises transmitting an acoustic frequency that is presentable by the remote audio system and that is above a frequency range of humanly perceptible sounds.

7. The method of claim 1, wherein detecting whether the audio output from the remote audio system is recognized as the test audio content comprises determining that: (i) the audio output is greater than a threshold; and (ii) a pattern of the audio output matches the test audio content.

8. The method of claim 1, wherein the audio content comprises a plurality of different types of audio content, including primary audio content and secondary audio content, the method further comprising:
transmitting the audio content to the remote audio system;
determining, by a controller of the electronic device, whether the audio output from the remote audio system is recognized as the audio content containing at least one of the primary and secondary audio contents;
in response to determining that the audio output includes at least one of the primary and secondary audio contents, playing a corresponding at least one of the primary and secondary audio contents on the remote audio system;
in response to determining that the audio output does not include the primary audio content, playing the primary audio content on the one or more speakers of the electronic device; and
in response to determining that the audio output does not include the secondary audio content, playing the secondary audio content on the one or more speakers of the electronic device.

9. The method of claim 1, wherein the audio content comprises a plurality of different types of audio content, the method further comprising:
determining whether a configuration setting indicates a selected one of: (i) a combined audio output that transmits secondary audio content to the remote audio system to output acoustically; and (ii) a split audio output that plays the secondary audio content on the one or more speakers of the electronic device;
in response to determining that the configuration setting indicates the combined audio output, transmitting to the remote audio system the audio content comprising primary audio content and secondary audio content; and
in response to determining that the configuration setting indicates the split audio output, playing the secondary audio content on the one or more speakers of the electronic device.

10. The method of claim 1, further comprising, in response to determining a pre-established time period has elapsed:
transmitting a next test audio content to the remote audio system; and
listening, via the microphone of the electronic device, for the next test audio output from the remote audio system.

11. The method of claim 1, further comprising transmitting the test audio content to the remote audio system via a selected one of: (i) wireless link; and (ii) wired link in response to a trigger event of a selected one of: (a) detecting connection of the selected one of: (i) the wireless link; and (ii) the wired link; (b) detecting a user input to change a configuration setting to routing to remote audio system; and (c) detecting selection of the audio content for playback.

12. An electronic device comprising:
a device interface;
at least one speaker;
a microphone
a memory containing audio content and a configuration setting; and
a controller communicatively coupled to the device interface, the at least one speaker, the microphone, and the memory and that executes an audio control utility that enables the electronic device to:
determine whether the configuration setting indicates audio content is to be transmitted to a remote audio system to output acoustically; and
in response to determining that the configuration setting indicates transmitting the audio content to the remote audio system:
transmit, by the electronic device, test audio content to the remote audio system;
listen, via a microphone of the electronic device, for audio output from the remote audio system;
in response to not detecting audio output from the remote audio system that is recognized as the test audio content, play audio content on one or more speakers of the electronic device; and
in response to detecting audio output from the remote audio system that is recognized as the test audio content:
transmit the audio content to the remote audio system to output acoustically;
detect, via the microphone, whether all of transmitted audio content is being played on the remote audio system; and
in response to detecting that not all of the transmitted audio content is being played at the remote audio system: play, on the one or more speakers of the electronic device, a corresponding portion of the transmitted audio content that is not being played by the remote audio system;

and play a remainder of the transmitted audio content on the remote audio system;
wherein audio content that is not being played at the remote audio system is concurrently played on the one or more speakers, while other content is being played at the remote audio system.

13. The electronic device of claim 12, wherein not detecting audio output that is recognized as the audio content comprises detecting no audio output from the remote audio system.

14. The electronic device of claim 12, further comprising:
detecting audio output from the remote audio system;
determining, by a controller of the electronic device, whether the audio output from the remote audio system is recognized as the audio content;
in response to determining that the audio output is recognized as the audio content:
determining whether an audio volume of the audio output is greater than an audio output threshold;
in response to determining that the audio volume of the audio output is greater than the audio threshold, discontinuing any playback of the audio content on the one or more speakers of the electronic device; and
in response to determining that the audio volume of the audio output is not greater than the audio threshold, playing the audio content on the one or more speakers of the electronic device.

15. The electronic device of claim 12, wherein the controller enables the electronic device to:
transmit the test audio content comprising the audio content;
in response to determining that the audio output from the remote audio system continues to be recognized as the audio content, periodically determine whether the audio output continues to be recognized as the audio content; and
in response to determining that the audio output is no longer recognized as the audio content, revert playing of the audio content to the one or more speakers of the electronic device.

16. The electronic device of claim 12, wherein the controller enables the electronic device to:
transmit the test audio content to the remote audio system comprises transmitting a unique acoustic pattern that is uniquely recognizable by the controller; and
in response to not detecting audio output from the remote audio system that is recognized as the unique acoustic pattern, play the audio content on one or more speakers of the electronic device; and
in response to detecting audio output from the remote audio system that is recognized as the unique acoustic pattern, transmit the audio content to the remote audio system to output acoustically.

17. The electronic device of claim 16, wherein the controller enables the electronic device to transmit the unique acoustic pattern by transmitting an acoustic frequency that is presentable by the remote audio system and that is above a frequency range of humanly perceptible sounds.

18. The electronic device of claim 12, wherein the audio content comprises a plurality of different types of audio content, the controller enables the electronic device to:
transmit to the remote audio system the test audio content comprising primary audio content and secondary audio content;
determine, by a controller of the electronic device, whether the audio output from the remote audio system is recognized as the audio content containing at least one of the primary and secondary audio content;
in response to determining that the audio output does not include the primary audio content, play the primary audio content on the one or more speakers of the electronic device; and
in response to determining that the audio output does not include the secondary audio content, play the secondary audio content on the one or more speakers of the electronic device.

19. The electronic device of claim 12, wherein the controller enables the electronic device to:
in response to not detecting audio output from the remote audio system that is recognized as the test audio content, continue to transmit the test audio content to the remote audio system while playing the audio content on one or more speakers of the electronic device; and
in response to determining a pre-established time period has elapsed, listen, by the microphone of the electronic device, for the test audio output from the remote audio system.

20. A computer program product comprising:
a computer readable storage device; and
program code on the computer readable storage device that when executed by a processor associated with an electronic device, the program code enables the electronic device to provide the functionality of:
determining, by a controller of an electronic device, whether a configuration setting indicates audio content is to be transmitted to a remote audio system to output acoustically; and
in response to determining that the configuration setting indicates transmitting the audio content to the remote audio system:
transmitting, by the electronic device, test audio content to the remote audio system;
listening, via a microphone of the electronic device, for audio output from the remote audio system;
in response to not detecting audio output from the remote audio system that is recognized as the test audio content, playing the audio content on one or more speakers of the electronic device; and
in response to detecting audio output from the remote audio system that is recognized as the test audio content:
transmitting the audio content to the remote audio system to output acoustically;
detecting, via the microphone, whether all of transmitted audio content is being played on the remote audio system; and
in response to detecting that not all of the transmitted audio content is being played at the remote audio system: playing, on the one or more speakers of the electronic device, a corresponding portion of the transmitted audio content that is not being played by the remote audio system; and playing a remainder of the transmitted audio content on the remote audio system;
wherein audio content that is not being played at the remote audio system is concurrently played on the one or more speakers, while other content is being played at the remote audio system.

* * * * *